United States Patent [19]

Woods et al.

[11] Patent Number: 4,934,885

[45] Date of Patent: Jun. 19, 1990

[54] TACK FASTENER

[75] Inventors: Quentin T. Woods, Redmond; Milton R. Jack, Everett; James S. Tallman, Seattle, all of Wash.

[73] Assignee: The Boeing Company, Seattle, Wash.

[21] Appl. No.: 705,219

[22] Filed: Feb. 25, 1985

[51] Int. Cl.$^5$ ............................................. F16B 13/06
[52] U.S. Cl. .......................................... 411/44; 411/57; 24/453; 24/606
[58] Field of Search .................. 411/94, 57, 78, 358, 411/71, 72, 45, 55, 107; 24/453, 407, 606, 604

[56] References Cited

U.S. PATENT DOCUMENTS

| | | | |
|---|---|---|---|
| 818,087 | 4/1906 | Harris | 411/57 X |
| 1,029,463 | 6/1912 | Rottler | 411/57 X |
| 1,700,354 | 1/1929 | Foss | 411/57 |
| 2,057,648 | 10/1936 | Kiefner | 411/57 |
| 2,301,244 | 11/1942 | Bishop | 411/57 |
| 2,370,776 | 3/1945 | Carlson | 411/55 X |
| 2,438,533 | 3/1948 | Booth | 411/57 |
| 2,675,607 | 4/1954 | Catlin | 411/368 X |
| 2,789,456 | 4/1957 | Brush . | |
| 2,816,471 | 12/1957 | Bachman . | |
| 2,826,110 | 3/1958 | Lemelson | 411/57 |
| 3,000,086 | 9/1961 | Davis | 24/453 X |
| 3,030,849 | 4/1962 | Bisbing et al. | 411/57 |
| 3,046,827 | 7/1962 | Myers . | |
| 3,085,462 | 4/1963 | Myers . | |
| 3,117,484 | 1/1964 | Myers . | |
| 3,218,906 | 11/1965 | Dupree | 411/533 |
| 3,426,399 | 2/1969 | Jones | 24/211 |
| 3,463,527 | 8/1969 | Baker . | |
| 3,505,922 | 4/1970 | Tinnerman . | |
| 3,534,650 | 10/1970 | Kubokawa | 24/453 X |
| 3,650,173 | 3/1972 | Mathe | 411/45 |
| 3,728,761 | 4/1973 | Holly | 24/73 |
| 3,858,478 | 1/1975 | Boudreau | 411/533 |
| 3,896,698 | 7/1975 | Aylott . | |
| 4,084,750 | 4/1978 | Fett . | |
| 4,182,218 | 1/1980 | Combette et al. | 411/57 |
| 4,316,689 | 2/1982 | Velasco | 411/57 |
| 4,449,877 | 5/1984 | Kessler | 411/57 |
| 4,537,542 | 8/1985 | Pratt et al. | 411/45 X |
| 4,548,533 | 10/1985 | Pratt | 411/45 X |
| 4,553,889 | 11/1985 | Dantec et al. | 411/55 X |

FOREIGN PATENT DOCUMENTS

| | | | |
|---|---|---|---|
| 482424 | 4/1952 | Canada | 411/57 |
| 941581 | 7/1948 | France | 411/45 |
| 838107 | 6/1981 | U.S.S.R. | 411/107 |
| 1315 | of 1901 | United Kingdom | 411/371 |
| 11620 | 10/1910 | United Kingdom | 24/607 |
| 603268 | 6/1948 | United Kingdom | 411/374 |
| 618033 | 2/1949 | United Kingdom | 411/60 |

Primary Examiner—Rodney M. Lindsey
Attorney, Agent, or Firm—Christensen, O'Connor, Johnson & Kindness

[57] ABSTRACT

A tack fastener comprising an elongate, tubular body (51), a stem (53) slidable in the body and a compression nut (91) is disclosed. The body (51) has an enlarged threaded hub (55) at one end, which supports the compression nut (91). The other end of the body is slit longitudinally to create a plurality of tangs (57)—preferably four. The tips (61) of the tangs (57) are enlarged and include an inner shoulder (63) that lies orthogonal to the axis of the body (51). The tangs (57) are heat treated to cause them to converge toward one another, resulting in the diameter of the enlarged tang tips (61) being the same or less than the diameter of the main part of the elongate, tubular body (51). When the slidable stem (53) is slid into the body (51), it forces the tangs (57) outwardly, positioning the tang shoulders (63) to impinge on the blind side of parts (105, 107) to be tack fastened together. Tack fastening is accomplished by pulling the tack fastener away from the parts after the tangs have been spread to cause the diverging tangs to wedge against the wall of the holes through which the tangs are inserted. Thereafter, the compression nut (91) is screwed toward the tang tips (61) resulting in the nut pressing the parts (105, 107) against the tang shoulders (63).

22 Claims, 3 Drawing Sheets

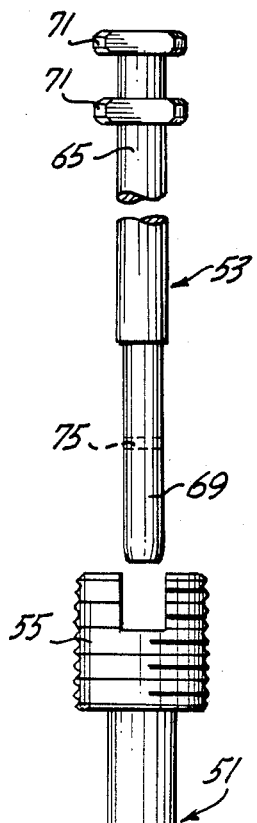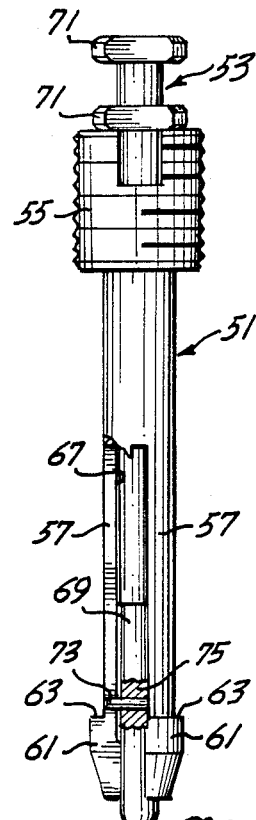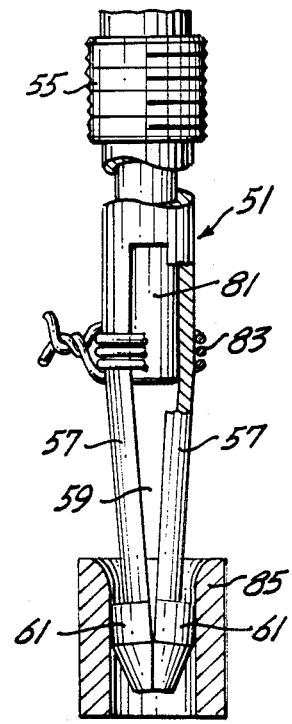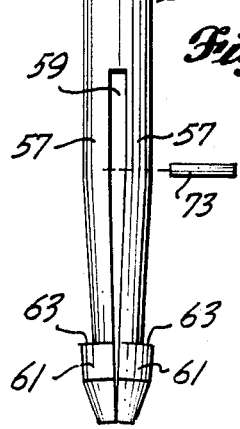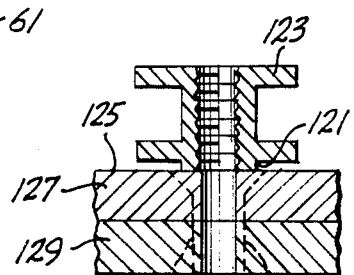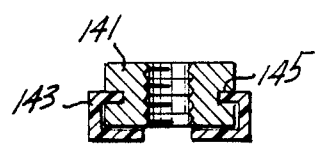

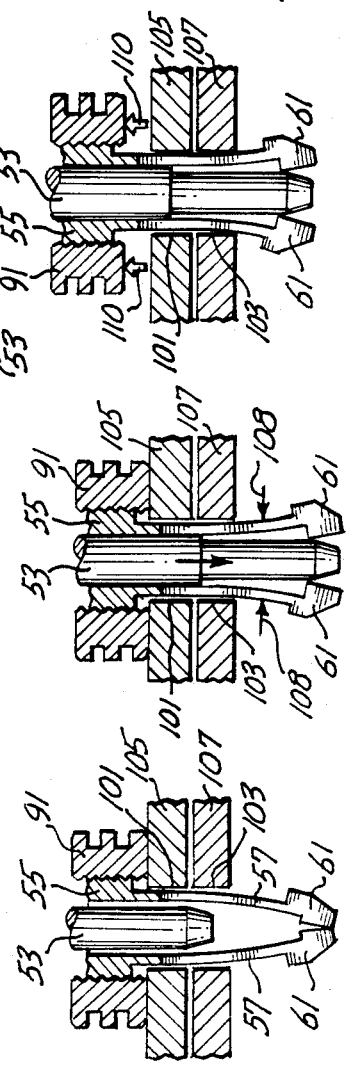

TACK FASTENER

TECHNICAL AREA

This invention relates to fasteners and, more particularly, fasteners for tacking (e.g., temporarily holding) two or more parts together.

BACKGROUND OF THE INVENTION

In many environments it is necessary to temporarily hold and clamp parts together while other operations, such as drilling and riveting operations, are performed. For example, tack fasteners are widely used in the aircraft industry to temporarily attach the sheets of metal used to form the skin of an aircraft to the flanges of supporting structural elements, such as stringers and frames. Since it is time consuming and sometimes difficult (and, therefore, expensive) to temporarily fasten parts together using conventional mechanical devices, such as nuts and bolts, tack fasteners have been developed to avoid these problems. While various tack fasteners have been developed, those that require access to only one side of the parts to be fastened together are preferred, at least in the aircraft industry.

In addition to being undesirably complex, one disadvantage of prior tack fasteners, particularly those used in the aircraft industry, resides mainly in the inability to provide the high compression forces that are occasionally needed to pull parts together. In the past, this disadvantage has been overcome by utilizing nuts and bolts in regions where abnormally high compression forces are required and/or using a large number of closely spaced tack fasteners. Obviously, both approaches have disadvantages. The installation of nuts and bolts is time consuming and, frequently, requires the services of two employees, rather than a single employee. The use of large numbers of tack fasteners requires the creation of additional tack fastener holes and is particularly undesirable when tack fasteners: (a) must be removed after permanent fasteners are installed in other holes; (b) the tack fastener holes drilled to a larger size; and, (c) permanent fasteners installed in the enlarged holes.

Another disadvantage of prior tack fasteners, particularly those that require access to only one side of the parts to be fastened together, relates to their difficulty of installation. Specifically, many prior tack fasteners have a barrel-like housing and parallel tangs that project outwardly from one end of the housing. The housing and components mounted in the housing coact together to pull the tangs into the housing when the housing and the components are rotated with respect to one another. The fastener is installed by pushing the tangs through aligned holes in the parts to be fastened together. After enlarged tips located at the ends of the tangs clear the blind side of the parts, the housing and the components are rotated to spread the tangs and, then, pull the tangs into the housing. Because the tangs are free to rotate with respect to the holes in the parts, housing and component rotation requires the use of both hands of the installer, at least until the parts are drawn together with an adequate amount of clamp up force.

The present invention is directed to providing a new and improved tack fastener that avoids the foregoing and other disadvantages of prior tack fasteners.

SUMMARY OF THE INVENTION

In accordance with this invention, a tack fastener comprising an elongate, tubular body, a stem slidable in the body and a compression nut mounted on the body is provided. The body has a threaded hub at one end and the compression nut is screwed onto the threads. The other end of the body is slit longitudinally to create a plurality of tangs. The tips of the tangs are enlarged and include an inner shoulder that lies orthogonal to the axis of the body. Preferably, the tangs are heat treated to cause them to converge toward one another, resulting in the diameter of the enlarged tang tips being the same or less than the diameter of the main part of the body. When the slidable stem is slid into the body, the tangs are forced outwardly, allowing the orthogonal shoulders to impinge on the blind side of parts to be tack fastened together. Preferably, the tangs diverge from one another in at least the region of the tips when the slidable stem is slid into the body.

The parts are compressed by sliding the tangs through aligned holes in the parts to be tack fastened together with the stem in a withdrawn position. Then the stem is slid into the body. Next, the tack fastener is pulled in the reverse direction until the diverging tanges are wedged against the sides of the holes in the parts. Finally, the compression nut is screwed toward the tangs resulting in the nut compressing the parts against the orthogonal shoulders of the tangs.

In accordance with further aspects of this invention, preferably, the diameter of the threaded hub is larger than the diameter of the main portion of the tubular body.

In accordance with other aspects of the invention, preferably, the number of tangs is equal to four. Also, preferably, after the stem is inserted into the body its full removal is prevented by a pin mounted in an orthogonal hole formed in the stem and alignable with at least one of the slits that separate the tangs.

As will be readily appreciated from the foregoing description, the invention provides a tack fastener that overcomes the disadvantages of prior tack fasteners. Specifically, because the tang shoulders lie orthogonal to the axis of the body of the tack fastener, large compression forces can be applied by a tack fastener formed in accordance with the invention. Because large compression forces are available, the need to use nut and bolt fasteners to create a high clamp-up force is avoided, or substantially reduced. Also, because high clamp-up forces can be created by tack fasteners formed in accordance with the invention, the number of tack fasteners needed to hold and clamp parts together is minimized. Further, because the diverging tangs wedge against the sides of the installation holes prior to tightening of the compression nut, rotation of the tangs is avoided. As a result, a tack fastener formed in accordance with the invention is easy to install, frequently requiring the use of only one hand.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 4 is an exploded view of the main elements of a tack fastener formed in accordance with the invention;

FIG. 5 is an assembly view, partially in section, of the tack fastener parts illustrated in FIG. 4;

FIG. 6 is an end view of FIG. 5;

FIG. 7 is a side view, partially in section, illustrating heat treating one of the tack fastener elements illustrated in FIGS. 4–6;

FIGS. 8A–8C are a series of views illustrating the insertion and use of a tack fastener formed in accordance with the invention;

FIGS. 9A–9D is a somewhat exaggerated series of views showing the positioning of the components of a tack fastener formed in accordance with the invention as parts are fastened together;

FIG. 10 is a cross-sectional view of an alternative embodiment of a compression nut usable with a tack fastener formed in accordance with the invention;

FIG. 11 is a cross-sectional view of a further alternative embodiment of a compression nut usable with a tack fastener formed in accordance with the invention; and FIG. 12 is a side view of a portion of a tack fastener formed in accordance with the invention with a protective sleeve.

DESCRIPTION OF THE PREFERRED EMBODIMENT

Figure 1:
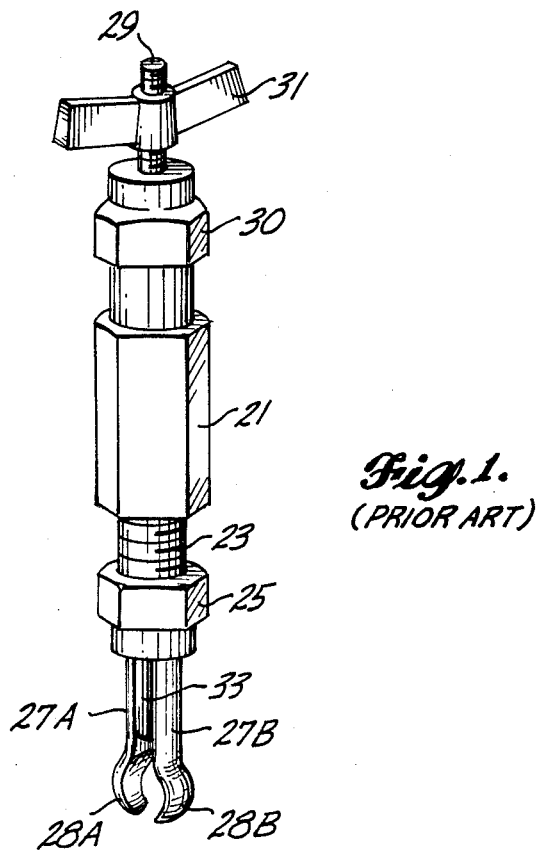
FIG. 1 is a pictorial view of a common prior art tack fastener.
Figure 2:
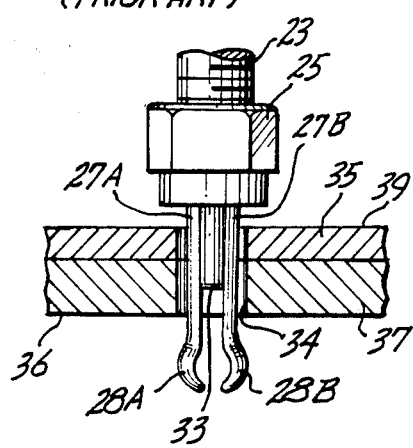
FIG. 2 is a cross-sectional view illustrating the insertion of a tack fastener of the type illustrated in FIG. 1 in a hole formed in two parts to be tack fastened together.
Figure 3:
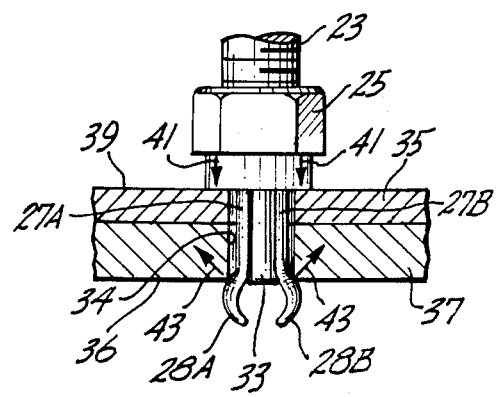
FIG. 3 is a cross-sectional view similar to FIG. 2 illustrating the direction of forces created by a tack fastener of the type illustrated in FIG. 1.

Because the invention will be better understood when compared with a tack fastener possessing the disadvantages it is designed to overcome, such a tack fastener is first illustrated and described. A tack fastener possessing the disadvantages the present invention is designed to overcome is illustrated in FIG. 1 and its application is illustrated in FIGS. 2 and 3. The tack fastener illustrated in FIG. 1, which is sold under the trademark COLECO by the Roller Bit Company, Houston, Tex., includes an elongate, hollow, main body 21 having a threaded protrusion 23 extending longitudinally outwardly from one end. Mounted on the threaded protrusion 23 is a compression nut 25. Extending outwardly from in the hollow body are a pair of parallel tangs 27A and 27B. The tangs 27A and 27B extend outwardly from the threaded protrusion end of the body 21, beyond the nut 25, and are relatively straight over a substantial portion of their length. The ends 28A and 28B of the tangs 27A and 27B are cup-shaped and oriented such that they face one another. As discussed more fully below, it is the curved outer surface of the cup-shaped ends 28A and 28B of the tangs 27A and 27B that form one of the main disadvantages of tack fasteners of the type illustrated in FIG. 1.

The parallel tangs 27A and 27B are attached to, or unitarily formed with, a threaded shaft 29 that passes through a sleeve 30 that extends into the body 21 from the end opposite to the threaded protrusion end. A wing nut 31 is mounted on the outer end of the threaded shaft 29. Because the threaded shaft 29 and the tangs 27A and 27B form a unitary structure, rotation of the wing nut 31 causes the cup-shaped ends 28A and 28B of the tangs 27A and 27B to be longitudinally moved with respect to the body 21. Rotation of the wing nut in one direction pulls the tangs 27A and 27B into the body. Rotation in the other direction (and axial pressure) causes the tangs to extend further outwardly.

A spreader 33 is positioned between the tangs 27A and 27B. The inner end of the spreader 33 has a T-shape that fits into slots formed in the interior of the sleeve 30. As a result, when the sleeve is rotated with respect to the body 21, the spreader 33 is rotated. The cross-sectional configuration of the leg of the spreader 33 is rectangular. As a result the space between the tangs, i.e., the tang spread, is determined by the position of the sleeve 30 with respect to the body 21. In one position the tangs spring to an inward position. A 90° rotation of the sleeve 30 with respect to the body 21 moves the tangs to an outward position.

As illustrated in FIG. 2, in the inward position, the cup-shaped ends 28A and 28B of the tangs 27A and 27B are sized such that they can be slid through a hole 34 of predetermined diameter formed in parts 35 and 37 to be fastened together. When the sleeve 30 is rotated 90° with respect to the body 21 after the cup-shaped ends are passed through the hole 34 the spreader 33 moves the tangs 27A and 27B outwardly. Thereafter the wing nut 31 is rotated to move the tangs toward the body 21 until they reach a point where the tangs impinge on the blind side 36 of the parts 35 and 37 to be tack fastened together when the compression nut impinges on the accessible side 39. Thereafter when the nut 25 is rotated a force that presses the parts 35 and 37 together is created, as illustrated in FIG. 3.

FIG. 3 illustrates one of the primary disadvantages of tack fasteners of the type illustrated in FIGS. 1–3. Specifically, as illustrated in FIG. 3, when tightened down the compression nut 25 creates a force that is orthogonal to the accessible side 39 of the parts 35 and 37 to be fastened. This force is represented by a first pair of arrows 41. Contrariwise, the blind side 36 force created by the cup-shaped ends 28A and 28B of the tangs 27A and 27B is not orthogonal. Rather, because the cup-shaped ends are curved, they create a force that impinges on the blind side corner of the hole 34 through which the tack fastener passes. As a result, the force applied by the cup-shaped ends 28A and 28B of the tanks 27A and 27B is not orthogonal to the blind side 36 of the parts 35 and 37. Rather, as shown by the arrows 43, the force applied by the tangs is directed outwardly as well as against the blind side 36. Since the force applied to the tangs by the parts is equal and opposite to the force applied by the tangs to the parts, a bending movement is applied to the cup-shaped ends. The bending movement causes the cup-shaped ends to move toward one another when large compression forces are created by the compression nut 25. The end result of this arrangement is a severe limitation on the amount of clamping and holding force that can be produced by tack fasteners of the type illustrated in FIGS. 1–3. More specifically, when attempts are made to utilize such tack fasteners to apply a large clamping and holding force, the cup-shaped ends 28A and 28B of the tangs 27A and 27B bend inwardly and are pulled into the hole 34 resulting in a loss of clamping force as well as an undesirable scoring and enlargement of the wall of the hole 34. In order to avoid this problem, in the past, the number of tack fasteners utilized when a high clamp up and holding force is called for were increased. Alternatively, devices suitable for creating larger clamping forces, such as nuts and bolts, were utilized. Both of these approaches are undesirable. The installation and use of excessive numbers of tack fasteners is time consuming and expensive. The installation of nuts and bolts is disadvantageous because such installation often requires the services of two people and because nut and bolt installation time is significantly greater than tack fastener installation time even when nuts and bolts are installed by one person. Thus, nut and bolt installation is also time consuming and, therefore, expensive.

Another disadvantage of tack fasteners of the type illustrated in FIGS. 1-3 is the difficulty of installing such fasteners. The difficulty occurs because the tangs 27A and 27B are free to spin in the hole 34. Because the tangs 27A and 27B are free to spin, the body 21 must be held as the tangs are pulled into the body until the cup-shaped ends 28A and 28B impinge on the blind side 36 of the parts with an adequate amount of force. Thus, not only are tack fasteners of the type illustrated in FIGS. 1-3 complex, they require the use of two hands, at least during the initial stages of their installation.

The present invention is directed to providing tack fasteners that avoid the disadvantages of tack fasteners of the type illustrated in FIGS. 1-3. FIG. 4 is an exploded view of a tack fastener formed in accordance with the invention and comprises an elongate, tubular body 51 and a stem 53. Located at one end of the elongate, tubular body 51 is an enlarged, threaded hub 55. The other end of the elongate, tubular body 51 is longitudinally slit to create four equally sized, equally spaced tangs 57. Located between each pair of adjacent tangs is a slot 59. Each of the tangs 57 has an enlarged tip 61. The inner end of the tip 61 includes shoulders 63 that lie in a common plane that lies orthogonal to the longitudinal axis of the elongate, tubular body 51. The outer ends of the enlarged tips 61 taper inwardly. In essence, the outer ends of the enlarged tips 61 define a truncated cone.

The stem 53 is sized to be housed in the longitudinal center cavity 67 of the elongate, tubular body 51. More specifically, the stem 53 includes a main region 65 having a diameter slightly smaller than the diameter of the longitudinal center cavity 67 of the elongate, tubular body 51 to allow the stem 53 to slide in the body 51. One end of the stem 53 is undercut to create a cylindrical spreader 69 having a diameter slightly smaller than the diameter of the main region 65 of the stem 53. The outer tip of the cylindrical spreader 69 is tapered slightly. The other end of the stem 53 includes a pair of protruding flanges 71 shaped to provide a flat surface that allows the stem to be manually pushed into the tubular body and gripped between a pair of fingers to be slid outwardly from the body, as described more fully below.

As illustrated in FIG. 5, when the stem 53 is fully inserted into the elongate, tubular body 51, the cylindrical spreader 69 lies between and spreads the tangs 57. The stem 53 is slidably retained in the elongate, tubular body 51 by a pin 73. The pin 73 is mounted in an orthogonal hole 75 located in the cylindrical spreader 69 of the stem 53. The pin length is greater than the diameter of the cylindrical spreader whereby the ends of the pins extend beyond the spreader, lying in an aligned pair of slots 59 that separate the tangs 57. As a result, after the pin is installed, the stem 53 only can be withdrawn to a point where the pin 73 impinges on the inner ends of the slots 59 in which it lies, and no further. When the stem is in this extended position, the tangs 57 spring inwardly.

The tangs spring inwardly when the stem is extended because, as illustrated in FIG. 7, after the slots 59 are formed in the elongate, tubular body 51, the body is heat treated while the tangs are pressed against one another. As a result, the tangs are "sprung" toward one another. More specifically, heat treating is accomplished by mounting a slut 81 in the elongate, tubular body 51. This slug 81 extends into the body from the threaded hub end thereof and terminates a short distance beyond the ends of the slots 59. Preferably a wire 83, or some other collar-like retention device, is wrapped around the outer surface of the tangs 57, near the end of the slug 81. Thereafter, the enlarged tips 61 of the tangs 57 are slid into a heat treating sleeve 85, which presses the enlarged tips 61 against one another. Thereafter, the elongate, tubular body 51 is heated and allowed to cool in a conventional heat treating manner, resulting in the tangs 57 taking on a permanent inward bend.

As best illustrated in FIGS. 4 and 7, after the tangs have been collapsed and heat treated, prior to the insertion of the stem into the tubular body 51, the outer diameter of the enlarged tips 61 of the tangs 57 is substantially equal to the diameter of the portion of the body 51 lying between the enlarged threaded hub 55 and the tangs 57. When the stem 53 is fully slid into the tubular body 51, as illustrated in FIG. 5, the tangs 57 are spread outwardly by the cylindrical spreader 69 of the stem 53. The outward movement of the tangs 57 created by the cylindrical spreader 69 results in the tangs 57 diverging slightly, as illustrated in an exaggerated manner in FIGS. 9B-9D, and described below. When the tangs are in their diverging position, the diameter of the enlarged tips 61 of the tangs 57 is substantially greater than the diameter of the portion of the body 51 located between the tangs 57 in the enlarged threaded hub 55. As will be better understood from the following description, when in this position, the shoulder 63 of the enlarged tips 61 create a flat region that impinges on the blind side of parts to be tack fastened together.

FIGS. 8A, 8B and 8C are a sequence of diagrams illustrating the use of a tack fastener formed in accordance with the invention. FIGS. 9A, 9B, 9C and 9D are a somewhat exaggerated series of views showing how the configuration of the tangs 57 changes during the installation of a tack fastener formed in accordance with the invention. As illustrated in these figures, in addition to the major elements illustrated in FIGS. 4-7 and heretofore described, a tack fastener formed in accordance with the invention also includes a clamp nut 91. While the clamp nut illustrated in FIGS. 8A-8C and FIGS. 9A-9D is a spanner type clamp nut, it is to be understood that the invention is not limited to spanner type nuts. Various other types of compression nuts, a couple of which are illustrated in FIGS. 11 and 12 and hereinafter described, can also be utilized.

As illustrated in FIG. 8A, the enlarged tips of a tack fastener formed in accordance with the invention are inserted through a pair of aligned holes 101 and 103 formed in the parts 105 and 107 to be tack fastened together. During insertion the stem 53 is withdrawn from the elongate tubular body 51. The diameter of the holes 101 and 103 is slightly greater than the diameter of the inwardly sprung enlarged tips 61 formed in the ends of the tangs 57. As a result, the enlarged tips 61 readily slide into the holes 101 and 103.

Continued movement of the tangs 57 into the holes 101 and 103 results in the enlarged tips 61 reaching the back or blind side 109 of the parts 105 and 107. See FIG. 9A. After the enlarged tips 61 have cleared the blind side end of the holes, the stem 53 is slid into the tubular body 51 resulting in the tangs 57 being spread outwardly as shown in an exaggerated manner in FIG. 9B.

The enlarged tips 61 are moved outwardly to a position whereat the diameter of the enlarged tips 61 becomes greater than the diameter of the holes 101 and 103. As a result, the shoulders 63 of the enlarged tips 61 are positioned to impinge on the blind side 109 of the parts 105 and 107. Further, because the tangs 57 diverge they have an outwardly increasing diameter. The increase in diameter is such that the diameter of the outer surface of the tangs becomes equal to the diameter of the holes 101 and 103 at a location inward of the shoulders 63 of the tang tips 61, as shown by the arrows 108 in FIG. 9B.

After the tangs 57 have been spread, the entire tack fastener is pulled in the reverse direction as illustrated by the arrows 110 in FIG. 9C. Pulling continues until the tangs are wedged in the hole 103 in the blind side part 107. This wedge lock prevents the elongate tubular body 51 from spinning when the nut 91 is rotated toward the parts to create a clamp up force. More specifically, as illustrated in FIG. 8C and FIG. 9D, after the enlarged tips 61 have cleared the blind side 109 of the parts 105 and 107, the clamp nut 91 is rotated in the direction that moves the nut 91 toward the accessible surface 111 of the nearest part 105. Continued rotation of the clamp nut 91 presses the parts 105 and 107 together and against the shoulders 63 of the enlarged tips 61 formed in the ends of the tangs 57. As a result, the parts are clamped and held together.

While not illustrated, if desired, a deformable material washer, such as a nylon washer, may be located between the clamp nut 91 and the accessible surface 111 to prevent the accessible surface 111 from becoming marred as the tack fastener is tightened. Similarly, if desired, as illustrated in FIG. 12 the outer surface of the tangs 57 can be coated or covered with a cylindrical sleeve 115 formed of a suitable deformable material, such as nylon, to prevent or minimize the scoring of the sidewalls of the holes 101 and 103 in the parts 105 and 107 when the tangs are spread outwardly and the tack fastener is tightened.

As noted above, nuts other than standard compression nuts of the type illustrated in FIGS. 8A-8C can be utilized in a tack fastener formed in accordance with the invention. Examples of two such alternative nuts are illustrated in FIGS. 10 and 11. FIG. 10 illustrates a spanner type nut having a protrusion 121 located around the portion of the hole in the nut 123 positioned to impinge on the accessible side 125 of the parts 127 and 129 to be clamped. The hub 121 is designed to impinge on the portion of the accessible side 125 that will be removed by enlarging the hole after the tack fastener is removed, prior to the installation of a permanent fastener. The permanent fastener hole is illustrated by dashed lines 131 in FIG. 11. As will be readily appreciated, for ease of illustration, FIG. 10 does not include the main body 51 or the stem 53 of a tack fastener formed in accordance with the invention. Only the nut 123 and the parts 127 and 129 are illustrated. FIG. 11 illustrates a conventional hex nut 141 in combination with a plastic washer 143 having rentention tabs designed to secure the washer to an annular groove 145 formed in the nut 141. The washer is mounted on the nut 141 so as to impinge on the accessible side of parts to be tack fastened together to prevent or at least substantially reduce the scarring thereof.

As will be readily appreciated from the foregoing description, a tack fastener formed in accordance with the invention overcomes the disadvantages of tack fasteners of the type illustrated in FIGS. 1-3. More specifically, the shoulder 63 formed in the tangs 57 impinges directly onto the flat surface of the blind side of parts to be clamped together by a tack fastener formed in accordance with the invention. As a result, an orthogonal blind side impingement force, as opposed to a diverging impingement force, is created by a tack fastener formed in accordance with the invention. Thus, no side forces tending to bend the tangs toward one another are created by a tack fastener formed in accordance with the invention. Moreover, even if a slight inward bending force is created, the cylindrical spreader lying between the enlarged tips of the tangs counteracts the bending force. As a result, tack fasteners formed in accordance with the invention can create clamp forces substantially greater than can tack fasteners of the type illustrated in FIGS. 1-3. Further, because of the wedge lock created by the diverging tangs, rotation of the tangs during clamp up is avoided.

While a preferred embodiment of a tack fastener formed in accordance with the invention has been illustrated and described, it will be appreciated that various changes can be made therein without departing from the spirit and scope of the invention. Consequently, the invention can be practiced otherwise than as specifically described herein.

The embodiments of the invention in which an exclusive property or privilege is claimed are defined as follows:

1. A tack fastener for temporarily holding two or more parts together comprising:
 (a) an elongate tubular body having:
  (i) a longitudinal center cavity;
  (ii) a threaded hub at one end; and
  (iii) a plurality of tangs at the other end, each of said tangs including an enlarged tip having an inner shoulder that lies orthogonal to the longitudinal center axis of said elongate tubular body;
 (b) a compression nut mounted on said threaded hub of said elongate tubular body, said compression nut including protection means covering a side of said compression nut that faces said plurality of tangs; and
 (c) a stem slidably mounted in said longitudinal central cavity in said elongate tubular body, said stem including a cylindrical spreader of fixed diameter movable between a position out of alignment with and a position in alignment with said enlarged tips of said tangs, when in said position in alignment with said enlarged tips, said spreader spreading said enlarged tips outwardly by a fixed amount and preventing the inward movement of said enlarged tips, said tangs diverging slightly outwardly when thus spread.

2. A tack fastener as claimed in claim 1, wherein said plurality of tangs equal four.

3. A tack fastener as claimed in claim 1, wherein said plurality of tangs are bent such that the enlarged tip region of said tangs are juxtaposed when said stem is in said position out of alignment with said enlarged tips.

4. A tack fastener as claimed in claim 1, wherein the diameter of said threaded hub is larger than the diameter of said portion of said elongate tubular body containing said tangs.

5. A tack fastener as claimed in claim 1, wherein said spreader is located on one end of said stem and wherein the other end of said stem includes finger gripping means.

6. A tack fastener as claimed in claim 5, wherein said finger gripping means comprises a pair of spaced-apart outwardly extending flanges.

7. A tack fastener as claimed in claim 5, including retention means for preventing said stem from being removed from said elongate tubular body.

8. A tack fastener as claimed in claim 7, wherein said retention means comprises a pin orthogonally mounted in said stem, said pin having a length greater than the thickness of said stem whereby said pin extends beyond the surface of said stem, said outwardly extending end of said pin lying in the space between a pair of adjacent tangs.

9. A tack fastener as claimed in claim 5, wherein said protection means comprises a nylon washer.

10. A tack fastener as claimed in claim 1, including a nylon sleeve mounted on said elongate tubular body so as to surround said plurality of tangs.

11. A tack fastener as claimed in claim 1, wherein said enlarged tips of said tangs have tapered outer ends.

12. A tack fastener as claimed in claim 1, wherein said compression nut includes a protrusion the side of said compression nut facing said plurality of tangs.

13. A tack fastener for temporarily holding two or more parts together comprising:
  (a) an elongate tubular body having:
    (i) a longitudinal center cavity;
    (ii) a threaded hub at one end; and
    (iii) a plurality of tangs at the other end, each of said tangs including an enlarged tip having an inner shoulder that lies orthogonal to the longitudinal center axis of said elongate tubular body;
  (b) a compression nut mounted on said threaded hub of said elongate tubular body; and
  a stem slidably mounted in said longitudinally central cavity in said elongate tubular body, and including finger gripping means comprising a pair of spaced apart outwardly extending flanges disposed on an end of the stem, said stem further including a cylindrical spreader of fixed diameter disposed on another end of said stem, said spreader being movable between a position out of alignment with and a position in alignment with said enlarged tips of said tangs, when in said position in alignment with said enlarged tips, said spreader spreading said enlarged tips outwardly by a fixed amount and preventing the inward movement of said enlarged tips, said tangs diverging slightly outwardly when thus spread.

14. A tack fastener as claimed in claim 13, wherein said plurality of tangs are bent such that the enlarged tip of said tangs are juxtaposed when said stem is in said position out of alignment with said enlarged tips.

15. A tack fastener as claimed in claim 13, wherein the diameter of said threaded hub is larger than the diameter of said end of said elongate tubular body on which are disposed said tangs.

16. A tack fastener as claimed in claim 13, including retention means for preventing said stem from being removed from said elongate tubular body.

17. A tack fastener as claimed in claim 16, wherein said retention means comprises a pin orthogonally mounted in said stem, said pin having a length greater than the thickness of said stem whereby said pin extends beyond the surface of said stem, said outwardly extending end of said pin lying in the space between a pair of adjacent tangs.

18. A tack fastener as claimed in claim 13, including protection means covering the side of said compression nut facing said plurality of tangs.

19. A tack fastener as claimed in claim 18, wherein said protection means comprises a nylon washer.

20. A tack fastener as claimed in claim 13, including a nylon sleeve mounted on said elongate tubular body so as to surround said plurality of tangs.

21. A tack fastener as claimed in claim 13, wherein said enlarged tips of said tangs have tapered outer ends.

22. A tack fastener as claimed in claim 13, wherein said compression nut includes a protrusion on the side of said compression nut facing said plurality of tangs.

* * * * *

UNITED STATES PATENT AND TRADEMARK OFFICE
CERTIFICATE OF CORRECTION

PATENT NO. : 4,934,885

DATED : June 19, 1990

INVENTOR(S) : Woods et al.

It is certified that error appears in the above-identified patent and that said Letters Patent is hereby corrected as shown below:

Drawing Sheet 2 of 3 should be deleted and replaced with the attached sheet.

Column 6, line 2    "slut" should be --slug--

Column 9, line 22    after "protrusion" insert --on--

Column 9, line 35    "longitudinally" should be --longitudinal--

Signed and Sealed this

Twenty-fifth Day of February, 1992

Attest:

HARRY F. MANBECK, JR.

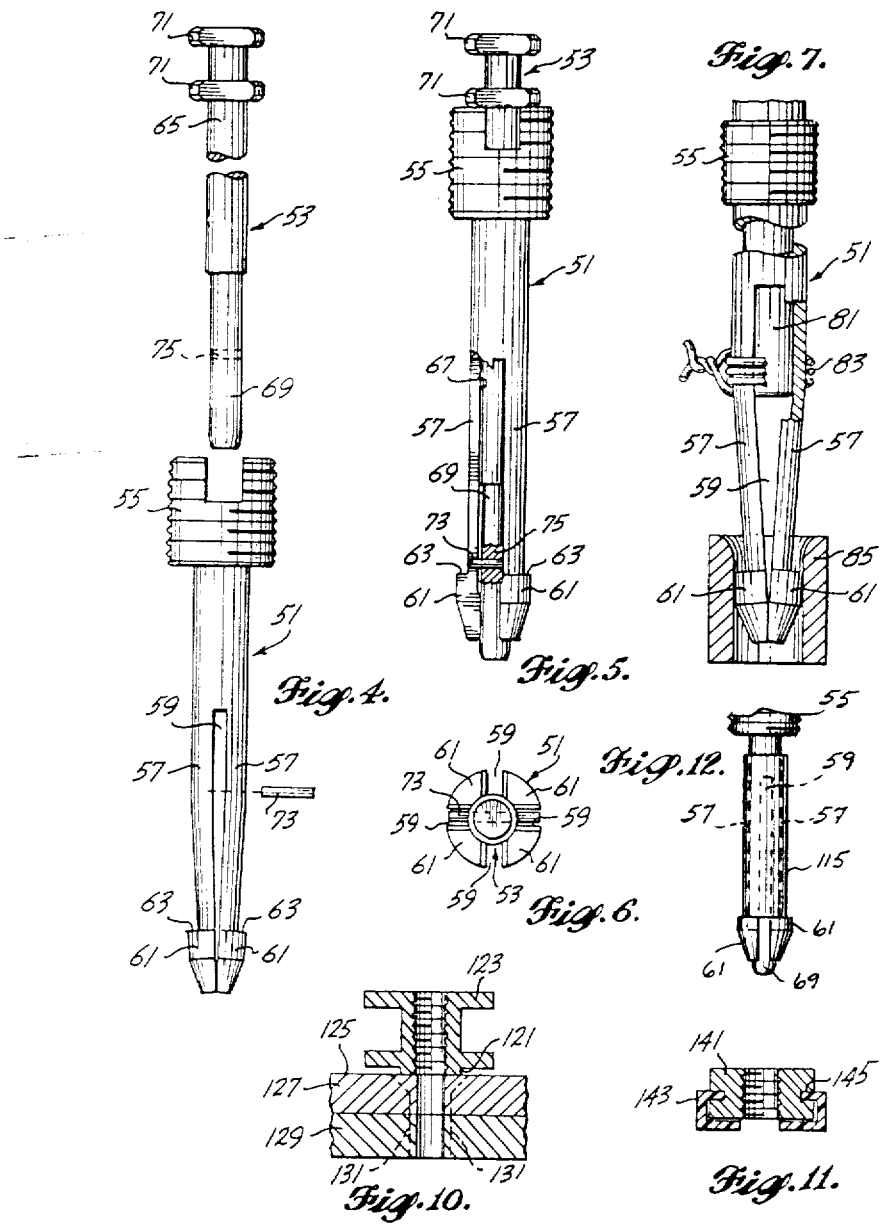

*Attesting Officer*    *Commissioner of Patents and Trademarks*